United States Patent
Lee et al.

(10) Patent No.: US 10,101,183 B2
(45) Date of Patent: Oct. 16, 2018

(54) METHOD AND APPARATUS FOR MANAGING SENSOR DATA

(71) Applicant: ELECTRONICS AND TELECOMMUNICATIONS RESEARCH INSTITUTE, Daejeon (KR)

(72) Inventors: Hyun Jeong Lee, Daejeon (KR); Jae Doo Huh, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 758 days.

(21) Appl. No.: 14/220,825

(22) Filed: Mar. 20, 2014

(65) Prior Publication Data

US 2014/0288866 A1    Sep. 25, 2014

(30) Foreign Application Priority Data

Mar. 21, 2013  (KR) .................. 10-2013-0030111
May 21, 2013  (KR) .................. 10-2013-0057029

(51) Int. Cl.
*G01D 18/00*    (2006.01)
*G01D 15/24*    (2006.01)
*G01D 3/08*    (2006.01)

(52) U.S. Cl.
CPC ............ *G01D 18/00* (2013.01); *G01D 3/08* (2013.01); *G01D 15/24* (2013.01)

(58) Field of Classification Search
CPC ........... G01D 18/00; G01D 3/08; G01D 15/24
See application file for complete search history.

(56) References Cited

U.S. PATENT DOCUMENTS

| | | | |
|---|---|---|---|
| 6,772,099 B2* | 8/2004 | Merkin ............... | G06F 11/3006 700/52 |
| 2009/0210075 A1* | 8/2009 | Moriwaki ........... | H04L 41/0654 700/28 |
| 2012/0246261 A1* | 9/2012 | Roh ..................... | G06F 13/385 709/217 |

FOREIGN PATENT DOCUMENTS

| KR | 1020110127975 A | 11/2011 |
|---|---|---|
| KR | 1020120107720 A | 10/2012 |
| KR | 1020120137584 A | 12/2012 |

* cited by examiner

*Primary Examiner* — Anh T. N. Vo
(74) *Attorney, Agent, or Firm* — Ladas & Parry LLP

(57) ABSTRACT

Provided is a method and apparatus for managing sensor data by determining an appropriate sensor data collection cycle for each service in view of a weighting such as an amount of energy saved by data collection cycles, a data storage space and data processing time, and a probability of an error happening, and collecting and manage sensor data based on the sensor data collection cycle. The apparatus for managing the sensor data includes a profile management unit to manage a sensor profile defining each sensor, a sensor system and a characteristic of a service, a service management unit to manage a preinstalled service and to collect and recommend a service based on the sensor profile from the sensor system, and a data collection cycle determination unit to determine a necessary sensor data collection cycle for the service. Furthermore, the apparatus includes a sensor data management unit to collect sensor data based on the sensor data collection cycle and to manage the sensor data, and an interface to connect the sensor system and an external device.

14 Claims, 3 Drawing Sheets

METHOD AND APPARATUS FOR MANAGING SENSOR DATA

CROSS-REFERENCE TO RELATED APPLICATIONS

This application claims the priority benefit of Korean Patent Application No. 10-2013-0030111, filed on Mar. 21, 2013, and Korean Patent Application No. 10-2013-0057029, filed on May 21, 2013, in the Korean Intellectual Property Office, the disclosures of which are incorporated herein by reference.

BACKGROUND

1. Field of the Invention

The present invention relates to a method and an apparatus for managing sensor data as a technology of efficiently managing resources. More particularly, the present invention relates to a method and an apparatus for managing sensor data that determine an appropriate sensor data collection cycle for each service in view of a weighting such as an amount of energy saved by data collection cycles, a data storage space and data processing time, and a probability of an error happening, and collect and manage sensor data based on the cycle so as to overcome difficulty in managing data with a growing number of sensors in a method of collecting data and providing services using a sensor in diverse areas.

2. Description of the Related Art

Recently, studies on sensor networks are actively conducted, in which a plurality of sensors is installed through different spots in a building to enable a server to receive information on diverse circumstances acquired from the sensors in an integrated manner, to recognize conditions of the spots in the building based on the received information, and to automatically take appropriate measures.

However, these conventional networks are generally configured such that the sensors installed in the respective spots in the building are always activated to acquire information on circumstances and appropriate measures are taken based on the information on the circumstances detected from changes in the sensors if the changes occur.

To keep the sensors of the building activated all the time, continuous power supply is needed for the sensors, resulting in inefficient power management due to unnecessary power consumption. Moreover, even a small change based on the information on the circumstances acquired from the sensors always activated causes an automated system in the building to operate, making it difficult to achieve efficient management.

Currently, there are methods of collecting data and providing services using a sensor in diverse areas of building, automobile, distribution, robot and real-time monitoring. These methods collect information from different sensors, while data becomes difficult to manage with a growing number of sensors. To resolve such a problem, efficient collection and management of sensor data are necessary based on a weighting such as an amount of energy saved by service cycles and data collection cycles, a data storage space and data processing time, and a probability of an error happening by data collection cycles.

KR Patent Publication No. 10-2011-0046849 discloses a method, system, and recording medium for maintaining sensor data security based on a time key. The method of maintaining sensor data security based on the time key includes encrypting sensor data with a password key drawn by using a time key-based polynomial derived using a random number and a secrete key shared between a sensor node and an application system, and decrypting the encrypted sensor data using a decryption key drawn by deriving the same time key-based polynomial using the random number and the secrete key. Accordingly, integrity and confidentiality of the sensor data may be maintained.

SUMMARY

According to an aspect of the present invention, there is provided an apparatus for managing sensor data, the apparatus including a profile management unit to manage a sensor profile defining each sensor, a sensor system and a characteristic of a service, a service management unit to manage a preinstalled service and to collect and recommend a service based on the sensor profile from the sensor system, a data collection cycle determination unit to determine a necessary sensor data collection cycle for the service, a sensor data management unit to collect sensor data based on the sensor data collection cycle and to manage the sensor data, and an interface to connect the sensor system and an external device.

The sensor system collects the sensor data and transmits profiles of each sensor and the sensor system to the apparatus through a wire-based or wireless network.

The profile management unit defines and manages names and functional characteristics of the service and the sensor.

The service management unit manages necessary sensor information for execution, change, deletion and recommendation services.

The data collection cycle determination unit determines the sensor data collection cycle in view of a weighting among an amount of energy saved by collection cycles, a data storage space and data processing time, and a probability of an error happening by collection cycles when the sensor data collection cycle is determined for the service.

The data collection cycle determination unit collects a preset amount of sensor data to determine the sensor data collection cycle and determines the cycle in view of the collected sensor data and the weighting.

According to an aspect of the present invention, there is provided a method of managing sensor data, the method including collecting sensor data from a sensor system, determining a sensor data collection cycle needed for the sensor data and a service, adaptively collecting and managing the sensor data based on the sensor data collection cycle, and determining whether the service is changed.

The determining of whether the service is changed repeats the collecting of the sensor data from the sensor system when the service is changed, and adaptively collects and manages the sensor data when the service is not changed.

The collecting of the sensor data from the sensor system collects, from the sensor system, a service based on a sensor profile defining each sensor, the sensor system and a characteristic of a service.

The determining of the sensor data collection cycle needed for the sensor data and the service determines the sensor data collection cycle in view of a weighting among an amount of energy saved by collection cycles, a data storage space and data processing time, and a probability of an error happening by collection cycles when the sensor data collection cycle is determined for the service.

The determining of the sensor data collection cycle needed for the sensor data and the service collects a preset amount of sensor data to determine the sensor data collection cycle and determines the cycle in view of the collected sensor data and the weighting.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments are described in detail with reference to the accompanying drawings.

Figure 1:
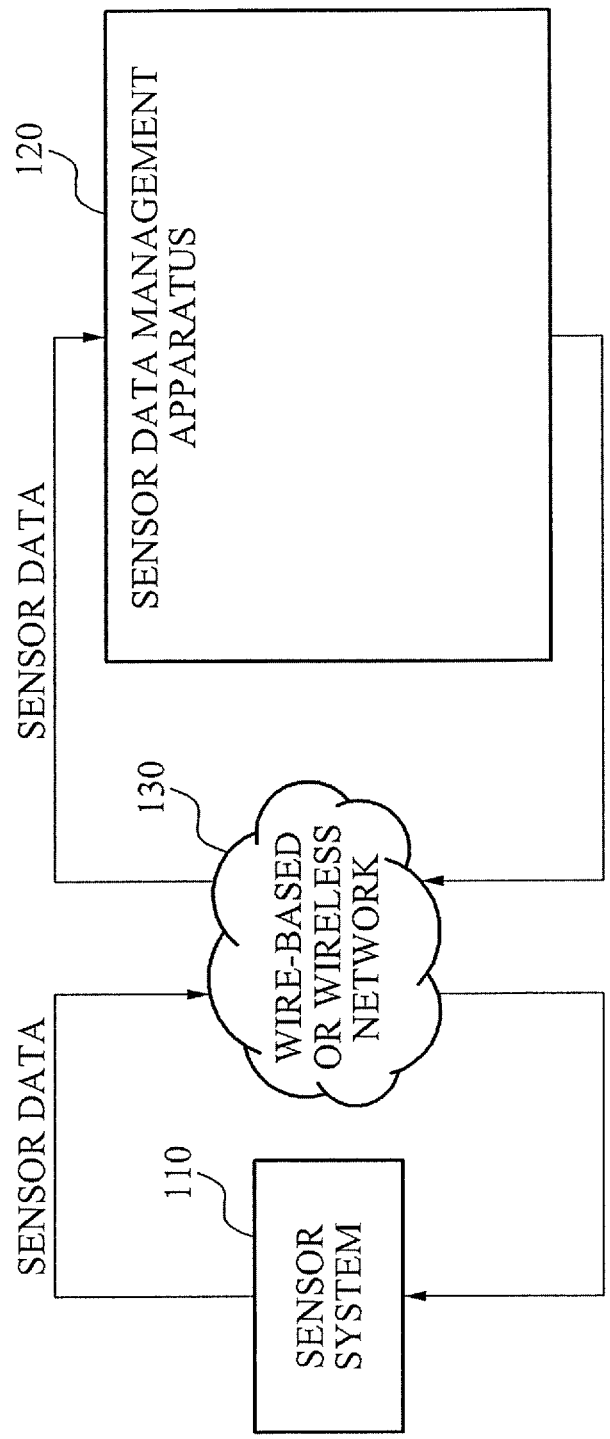
FIG. 1 is a diagram illustrating a sensor data management apparatus and a sensor system communicating with the sensor data management apparatus through a wire-based or wireless network.

FIG. 1 is a diagram illustrating an apparatus for managing sensor data and a sensor system communicating with the sensor data management apparatus through a wire-based or wireless network. Hereinafter, the apparatus for managing sensor data may be also referred to as a sensor data management apparatus.

Conventionally, there are methods of collecting data and providing services using a sensor in various areas of building, automobile, distribution, robot and real-time monitoring. Although these methods collect information from different sensors, a growing number of sensors make it difficult to manage data.

These conventional sensor data management methods do not consider a data collection interval and thus have limits in data management with an exponential increase in amount of data. A sensor data management apparatus according to an exemplary embodiment, which is suggested to overcome the foregoing problem, defines services installed for or related to each area and designates appropriate sensors for the services. Also, the sensor data management apparatus may collect and manage sensor data in view of a weighting such as an amount of energy saved by service cycles and data collection cycles, a data storage space and data processing time, and a probability of an error happening by data collection cycles.

Referring to FIG. 1, the sensor data management apparatus 120 according to the exemplary embodiment may collect sensor data the sensor system 110 through the wire-based or wireless network 130. The sensor system 110 collecting sensor data initially transmits profiles of each sensor and the sensor system to the sensor data management apparatus 120 once, and transmits changed profiles if the profiles are changed. The transmitted profiles of each sensor and the sensor system are collected by a service management unit of the sensor data management apparatus 120.

Subsequently, in determining a sensor data collection cycle by services, the sensor data management apparatus 120 determines the sensor data collection interval in view of the weighting such as an amount of energy saved by collection cycles, a data storage space and data processing time, and a probability of an error happening by collection cycles, and collects and manages sensor data from each sensor at the interval, thereby efficiently managing sensor data and saving power of the sensors and resources for storing the sensor data.

Figure 2:
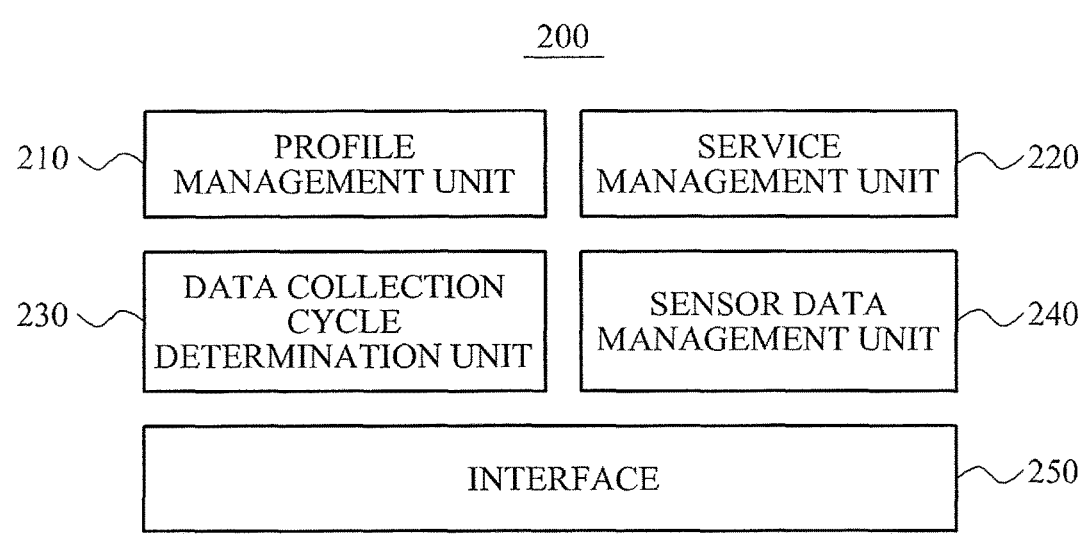
FIG. 2 is a block diagram illustrating a configuration of the sensor data management apparatus according to an exemplary embodiment.

FIG. 2 is a block diagram illustrating a configuration of a sensor data management apparatus according to an exemplary embodiment.

Referring to FIG. 2, the sensor data management apparatus includes a profile management unit 210, a service management unit 220, a data collection cycle determination unit 230, a sensor data management unit 240 and an interface 250.

The profile management unit 210 manages a sensor profile which defines each sensor, the sensor system 110 and characteristics of services.

The service management unit 220 may collect and recommend a service based on the profile from the sensor system 110.

The service management unit 220 manages a preinstalled service, and collects and recommends a service based on the sensor profile from the sensor system 110.

The sensor system 110 collecting sensor data initially transmits profiles of each sensor and the sensor system to the sensor data management apparatus 200 once, and transmits changed profiles if the profiles are changed. The transmitted profiles of each sensor and the sensor system are collected by the service management unit 220 of the sensor data management apparatus 200. The service management unit 220 manages the preinstalled service by execution, change, deletion or recommendation, and collects and recommends an appropriate service based on the sensor profile. Further, the service management unit 220 may manage necessary sensor information for a service.

The data collection cycle determination unit 230 determines a necessary sensor data collection cycle for a service.

For instance, the data collection cycle determination unit 230 may determine a sensor data collection cycle needed for each service according to a service policy. In determining the sensor data collection cycle for each service, the data collection cycle determination unit 230 determines an appropriate sensor data collection cycle in view of a weighting such as an amount of energy saved by collection cycles, a data storage space and data processing time, and a probability of an error happening by collection cycles. To determine the cycle, the data collection cycle determination unit 230 collects a certain amount of sensor data and determines an appropriate sensor data collection cycle based on the data in view of a weighting such as an amount of energy saved by collection cycles, a data storage space and data processing time, and a probability of an error happening by collection cycles. The sensor data management unit 240 collects sensor data based on the determined appropriate sensor data collection cycle and manages the sensor data.

The sensor data management unit 240 collects sensor data based on the sensor data collection cycle and manages the sensor data.

The sensor data management unit 240 may collect sensor data based on the sensor data collection cycle needed for each service, and manage the sensor data, for example, by storage or retrieval.

When the service is changed as a result of determining whether the service is changed, collecting sensor data from the sensor system by the service management unit 220 is repeated. When the service is not changed, however, the sensor data management unit 240 adaptively collects and manages the sensor data.

The interface 250 connects the sensor system and an external device.

The sensor system 110 collecting the sensor data may use the interface 250 both to initially transmit the profiles of the sensor and the sensor system and to transmit changed profiles if the profiles are changed.

Figure 3:
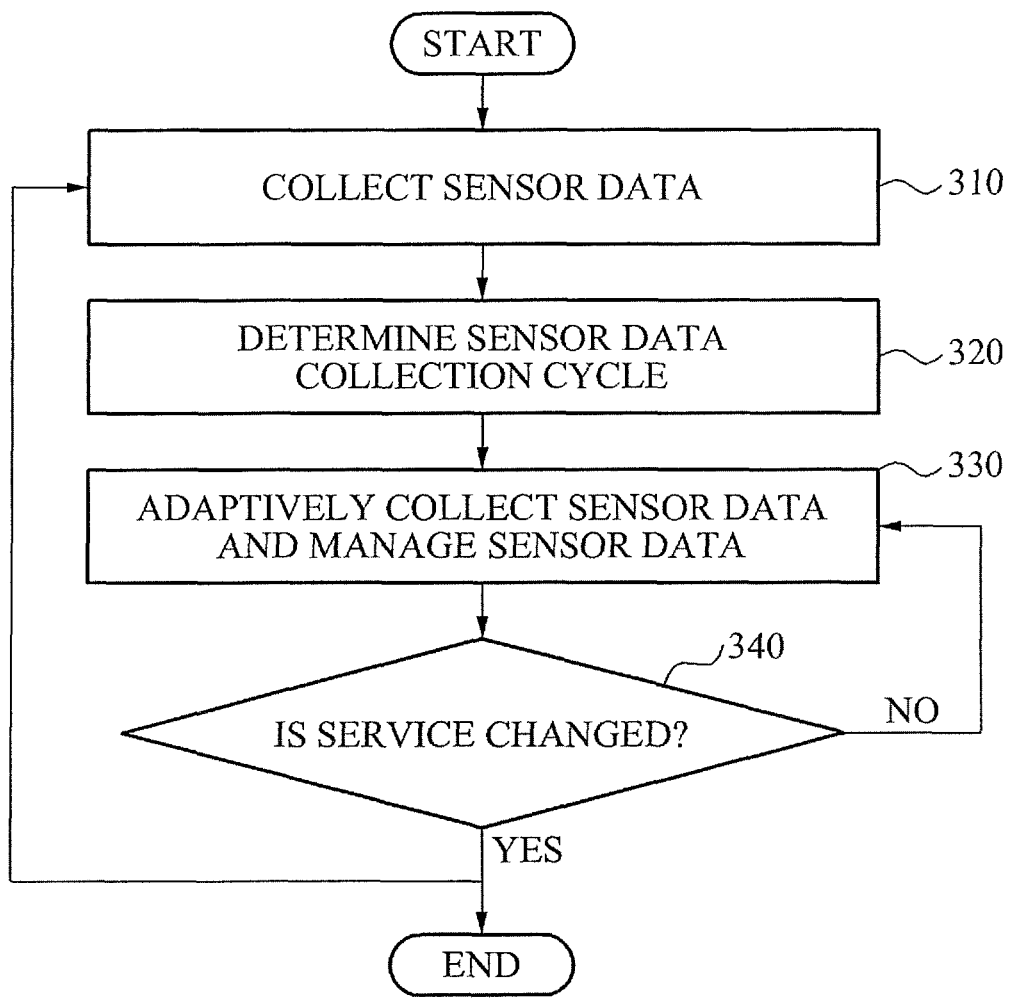
FIG. 3 is a flowchart illustrating a sensor data management method according to an exemplary embodiment.

FIG. 3 is a flowchart illustrating a sensor data management method according to an exemplary embodiment.

The sensor data management method includes collecting sensor data from the sensor system in operation 310, determining a sensor data collection cycle needed for the sensor data and a service in operation 320, adaptively collecting and managing the sensor data based on the sensor data collection cycle in operation 330 and determining whether the service is changed in operation 340.

Referring to FIG. 3, the sensor data management apparatus may collect sensor data from the sensor system via the wire-based or wireless network in operation 310.

The sensor data management apparatus may be connected to the sensor system and an external device through the interface. The sensor system collecting sensor data initially transmits profiles of each sensor and the sensor system to the sensor data management apparatus once, and transmits changed profiles if the profiles are changed. The sensor system may use the interface both to initially transmit the profiles of the sensor and the sensor system and to transmit the changed profiles if the profiles are changed. The transmitted profiles of each sensor and the sensor system are collected by the service management unit of the sensor data management apparatus.

Subsequently, in determining a sensor data collection cycle by services, the sensor data management apparatus determines a sensor data collection interval in view of a weighting such as an amount of energy saved by collection cycles, a data storage space and data processing time, and a probability of an error happening by collection cycles, and collects and manages sensor data from each sensor at the interval, thereby efficiently managing sensor data and saving power of the sensors and resources for storing sensor data. The profile management unit may manage a sensor profile which defines each sensor, the sensor system 10 and characteristics of services, and the service management unit may collect and recommend a service based on the profile from the sensor system.

Next, the sensor data management apparatus determines a sensor data collection cycle needed for the sensor data and a service in operation 320.

The service management unit manages a preinstalled service by execution, change, deletion or recommendation, and collects and recommends an appropriate service based on the sensor profile. Further, the service management unit may manage necessary sensor information for a service. The data collection cycle determination unit determines a necessary sensor data collection cycle for a service.

For instance, the data collection cycle determination unit may determine a sensor data collection cycle needed for each service according to a service policy. In determining the sensor data collection cycle for each service, the data collection cycle determination unit determines an appropriate sensor data collection cycle in view of a weighting such as an amount of energy saved by collection cycles, a data storage space and data processing time, and a probability of an error happening by collection cycles. To determine the cycle, the data collection cycle determination unit collects a certain amount of sensor data and determines an appropriate sensor data collection cycle based on the data in view of a weighting such as an amount of energy saved by collection cycles, a data storage space and data processing time, and a probability of an error happening by collection cycles. The sensor data management unit collects sensor data based on the determined appropriate sensor data collection cycle and manages the sensor data.

The sensor data management apparatus adaptively collects and manages the sensor data based on the sensor data collection cycle in operation 330.

The sensor data management unit collects sensor data based on the sensor data collection cycle and manages the sensor data. The sensor data management unit may collect sensor data based on the sensor data collection cycle needed for each service, and manage the sensor data, for example, by storage or retrieval.

Finally, the sensor data management apparatus determines whether the service is changed in operation 340.

When the service is changed as a result of determining whether the service is changed, the collecting of the sensor data from the sensor system in operation 310 is repeated. When the service is not changed, however, the adaptively collecting and managing of the sensor data in operation 330 is carried out.

The sensor data management method enables efficient management of resources. The sensor data management method determines an appropriate sensor data collection cycle for each service in view of a weighting such as an amount of energy saved by data collection cycles, a data storage space and data processing time, and a probability of an error happening by collection cycles, and collects and manages sensor data based on the cycle, thereby overcoming difficulty in managing data with an increasing number of sensors with respect to a method of collecting data and providing a service using a sensor.

Accordingly, sensor data may be efficiently managed, and power of sensors and resources for storing sensor data may be saved.

Conventional sensor data management methods do not consider a data collection interval and thus have limits in data management with an exponential increase in amount of data. Also, in methods of collecting data and providing services using a sensor in various areas, a growing number of sensors may make it difficult to manage data.

An aspect of the present invention is to provide a method and apparatus for determining an appropriate data collection interval to provide services and for collecting and managing sensor data based on the cycle. Accordingly, a method and apparatus for managing sensor data according to an exemplary embodiment define services installed for or related to each area, designate appropriate sensors necessary for the services, determine a sensor data collection interval in view of different weightings, and collect and manage sensor data from the sensors at the interval, thereby efficiently managing sensor data and saving power of the sensors and resources for storing the sensor data.

As described above, a method and an apparatus for managing sensor data according to exemplary embodiments determine a sensor data collection cycle in view of initially collected sensor data and a weighting such as an amount of energy saved by collection cycles, a data storage space and data processing time, and a probability of an error happening by collection cycles, and collect and manage sensor data, thereby efficiently managing the sensor data and saving power of the sensors and resources for storing sensor data.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

What is claimed is:

1. An apparatus for managing sensor data from a plurality of sensors, the apparatus comprising:
    a profile management unit to manage a sensor profile defining each sensor of the plurality of sensors, a sensor system and a characteristic of a service;
    a service management unit to manage a preinstalled service and to collect and recommend a service based on the sensor profile from the sensor system;
    a data collection cycle determination unit to determine a necessary sensor data collection cycle based on the service during which sensor data from each sensor of the plurality of sensors is collected;
    a sensor data management unit to collect sensor data based on the sensor data collection cycle and to manage the sensor data; and
    an interface to connect the sensor system and an external device.

2. The apparatus of claim 1, wherein the sensor system collects the sensor data and transmits profiles of each sensor and the sensor system to the apparatus through a wire-based or wireless network.

3. The apparatus of claim 1, wherein the profile management unit defines and manages names and functional characteristics of the service and the sensor.

4. The apparatus of claim 1, wherein the service management unit manages necessary sensor information for execution, change, deletion and recommendation services.

5. The apparatus of claim 1, wherein the data collection cycle determination unit determines the sensor data collection cycle in view of a weighting among an amount of energy saved by collection cycles, a data storage space and data processing time, and a probability of an error happening by collection cycles when the sensor data collection cycle is determined for the service.

6. The apparatus of claim 5, wherein the data collection cycle determination unit collects a preset amount of sensor data to determine the sensor data collection cycle and determines the cycle in view of the collected sensor data and the weighting.

7. A method of managing sensor data, the method comprising:
    collecting sensor data from a sensor system;
    determining a sensor data collection cycle needed for the sensor data and a service;
    adaptively collecting and managing the sensor data based on the sensor data collection cycle; and
    determining whether the service is changed,
    wherein the determining of the sensor data collection cycle needed for the sensor data and the service determines the sensor data collection cycle in view of a weighting based on an amount of energy saved by collection cycles, a data storage space and data processing time, and a probability of an error happening by collection cycles when the sensor data collection cycle is determined for the service.

8. The method of claim 7, wherein when determining whether the service is changed, when service is not changed maintaining the sensor data collection cycle already determined and collecting and managing the sensor data based on the maintained sensor data collection cycle.

9. The method of claim 7, wherein the collecting of the sensor data from the sensor system collects, from the sensor system, a service based on a sensor profile defining each sensor, the sensor system and a characteristic of a service.

10. The method of claim 7, wherein the determining of the sensor data collection cycle needed for the sensor data and the service collects a preset amount of sensor data to determine the sensor data collection cycle and determines the cycle in view of the collected sensor data and the weighting.

11. An apparatus for managing sensor data from a plurality of sensors, the apparatus comprising:
 a profile management unit to manage a sensor profile defining each sensor of the plurality of sensors, a sensor system and a characteristic of a service;
 a service management unit to manage a preinstalled service and to collect and recommend a service based on the sensor profile from the sensor system, wherein the service management unit manages the preinstalled service by execution, change, deletion or recommendation, and collects and recommends an appropriate service based on the sensor profile;
 a data collection cycle determination unit to determine a necessary sensor data collection cycle for the service during which sensor data from each sensor of the plurality of sensors is collected, wherein to determine the data collection cycle, the data collection cycle determination unit collects a preset amount of sensor data and determines an appropriate sensor data collection cycled based on the collected data in view of a weighting;
 a sensor data management unit to collect sensor data based on the sensor data collection cycle and to manage the sensor data, wherein the sensor data management unit collects the sensor data in each of a plurality of the sensor data collection cycles; and
 an interface to connect the sensor system and an external device.

12. The apparatus of claim 11, wherein the sensor system collects the sensor data and transmits profiles of each sensor and the sensor system to the apparatus through a wire-based or wireless network.

13. The apparatus of claim 11, wherein the profile management unit defines and manages names and functional characteristics of the service and the sensor.

14. The apparatus of claim 11, wherein the data collection cycle determination unit determines the sensor data collection cycle in view of a weighting among an amount of energy saved by collection cycles, a data storage space and data processing time, and a probability of an error happening by collection cycles when the sensor data collection cycle is determined for the service.

* * * * *